US010325309B2

(12) United States Patent
Gadre et al.

(10) Patent No.: US 10,325,309 B2
(45) Date of Patent: Jun. 18, 2019

(54) OMNICHANNEL RETAILING

(71) Applicant: eBay Inc., San Jose, CA (US)

(72) Inventors: Akshay Gadre, North Wales, PA (US); Dennis Driscoll, Chalfont, PA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/096,945

(22) Filed: Dec. 4, 2013

(65) Prior Publication Data

US 2015/0039461 A1 Feb. 5, 2015

Related U.S. Application Data

(60) Provisional application No. 61/861,320, filed on Aug. 1, 2013.

(51) Int. Cl.
*G06Q 30/06* (2012.01)

(52) U.S. Cl.
CPC ..... *G06Q 30/0639* (2013.01); *G06Q 30/0631* (2013.01); *G06Q 30/0633* (2013.01); *G06Q 30/0635* (2013.01)

(58) Field of Classification Search
USPC ....................................................... 705/26.7
See application file for complete search history.

(56) References Cited

U.S. PATENT DOCUMENTS

| 6,442,530 | B1 * | 8/2002 | Miller | G06Q 10/087 705/16 |
| 6,574,549 | B2 * | 6/2003 | Cato et al. | 701/533 |
| 8,239,276 | B2 * | 8/2012 | Lin et al. | 705/26.1 |
| 8,412,590 | B2 * | 4/2013 | Elliott | 705/26.9 |
| 2005/0165649 | A1 * | 7/2005 | Mahaffey et al. | 705/26 |
| 2006/0010046 | A1 * | 1/2006 | Van Zandt | 705/26 |
| 2006/0059049 | A1 * | 3/2006 | Morris | G06Q 30/02 705/26.1 |

(Continued)

FOREIGN PATENT DOCUMENTS

| WO | WO-2012177382 A2 | 12/2012 |
| WO | WO-2014089245 A1 | 6/2014 |
| WO | WO-2015017061 A1 | 2/2015 |

OTHER PUBLICATIONS

Garry, M., 2010. Consumers to Dictate What They Want From Retailers. Supermarket News, 58(20), pp. NA.*

(Continued)

*Primary Examiner* — Jason B Dunham
*Assistant Examiner* — Brittany E Bargeon
(74) *Attorney, Agent, or Firm* — Schwegman Lundberg & Woessner, P.A.

(57) ABSTRACT

A device may determine its location within a store and display the location on a map of the store. A user may provide a shopping list to the device. The device may then display the location of desired items on the map of the store. When an item is located in multiple locations, the device may display one or more of the locations for the item. The device may suggest a route through the store by which the user can find all of the items on the shopping list. The device may recommend products to the user based on items near the device, items on the shopping list, or items identified by the user. The device may have the ability to identify items. The device may communicate with the server to gather information about an identified item.

12 Claims, 12 Drawing Sheets

(56) References Cited

U.S. PATENT DOCUMENTS

| | | | |
|---|---|---|---|
| 2006/0190340 A1* | 8/2006 | Myskowski | 705/26 |
| 2009/0012704 A1 | 1/2009 | Franco et al. | |
| 2009/0182499 A1* | 7/2009 | Bravo | 701/207 |
| 2010/0057541 A1* | 3/2010 | Bonner et al. | 705/10 |
| 2010/0106591 A1* | 4/2010 | Fuzell-Casey et al. | 705/14.25 |
| 2010/0299188 A1* | 11/2010 | Karnalkar et al. | 705/14.1 |
| 2011/0173041 A1* | 7/2011 | Breitenbach et al. | 705/7.13 |
| 2011/0191207 A1* | 8/2011 | Schueller et al. | 705/26.9 |
| 2012/0099756 A1 | 4/2012 | Sherman et al. | |
| 2012/0214515 A1* | 8/2012 | Davis | H04W 4/023 455/456.3 |
| 2013/0046624 A1 | 2/2013 | Calman et al. | |
| 2013/0080289 A1* | 3/2013 | Roy | G06Q 10/10 705/26.8 |
| 2013/0173387 A1* | 7/2013 | Adelaar | 705/14.53 |
| 2013/0191246 A1* | 7/2013 | Calman | G06Q 30/0639 705/26.9 |
| 2013/0218721 A1* | 8/2013 | Borhan et al. | 705/26.41 |
| 2014/0052562 A1* | 2/2014 | Oliveira et al. | 705/26.5 |
| 2014/0067564 A1* | 3/2014 | Yuan | 705/16 |
| 2014/0156459 A1* | 6/2014 | Zises | 705/26.61 |
| 2014/0222612 A1* | 8/2014 | Knudson et al. | 705/26.7 |

OTHER PUBLICATIONS

Garry, M, Consumers to Dictate What They Want From Retailers, 2010, Supermarket News, 58(20), pp. NA (Year: 2010).*

"The Luxury and Premium Online Consumer: Turning Online Behaviors into Actionable Digital Strategies", [Online]. Retrieved from the Internet: <URL: http://www.iprospect.com/wp-content/uploads/2011/11/The-Luxury-and-Premium-Consumer-Whitepaper.pdf>, (Jun. 2011), 25 pgs.

Bao, Jie, et al., "Location-based and Preference-Aware Recommendation Using Sparse Geo-Social Networking Data", SIGSPATIAL '12 Proceedings of the 20th International Conference on Advances in Geographic Information Systems, (2012), 199-208.

Castelluccia, Claude, Chapter 2: Behavioural Tracking on the Internet: A Technical Perspective, European Data Protection: In Good Health?, (2012), 21-33.

Rollison, Damian, "Big Data and Local Search: The Netflix Precedent", [Online]. Retrieved from the Internet: <URL: http://streetfightmag.com/2013/02/07/big-data-and-local-search-the-netflix-precedent/>, (Feb. 7, 2013), 7 pgs.

"International Application Serial No. PCT/US2014/044605, International Search Report dated Nov. 7, 2014", 2 pgs.

"International Application Serial No. PCT/US2014/044605, Written Opinion dated Nov. 7, 2014", 4 pgs.

* cited by examiner

OMNICHANNEL RETAILING

CROSS-REFERENCE TO RELATED APPLICATIONS

This application claims the benefit of U.S. Provisional Application No. 61/861,320, filed Aug. 1, 2013, entitled "OMNICHANNEL RETAILING," which is incorporated herein by reference in its entirety.

TECHNICAL FIELD

The subject matter disclosed herein generally relates to the processing of data. Specifically, the present disclosure addresses systems and methods for omnichannel retailing.

BACKGROUND

A user may purchase items in a physical retail store or from an online marketplace. An online marketplace may dynamically generate offers, promotions, or discounts for the user. A physical retail store may distribute coupons by direct mail, publication in periodicals, or placement in the store.

BRIEF DESCRIPTION OF THE DRAWINGS

Some embodiments are illustrated by way of example and not limitation in the figures of the accompanying drawings.

DETAILED DESCRIPTION

Figure 1:
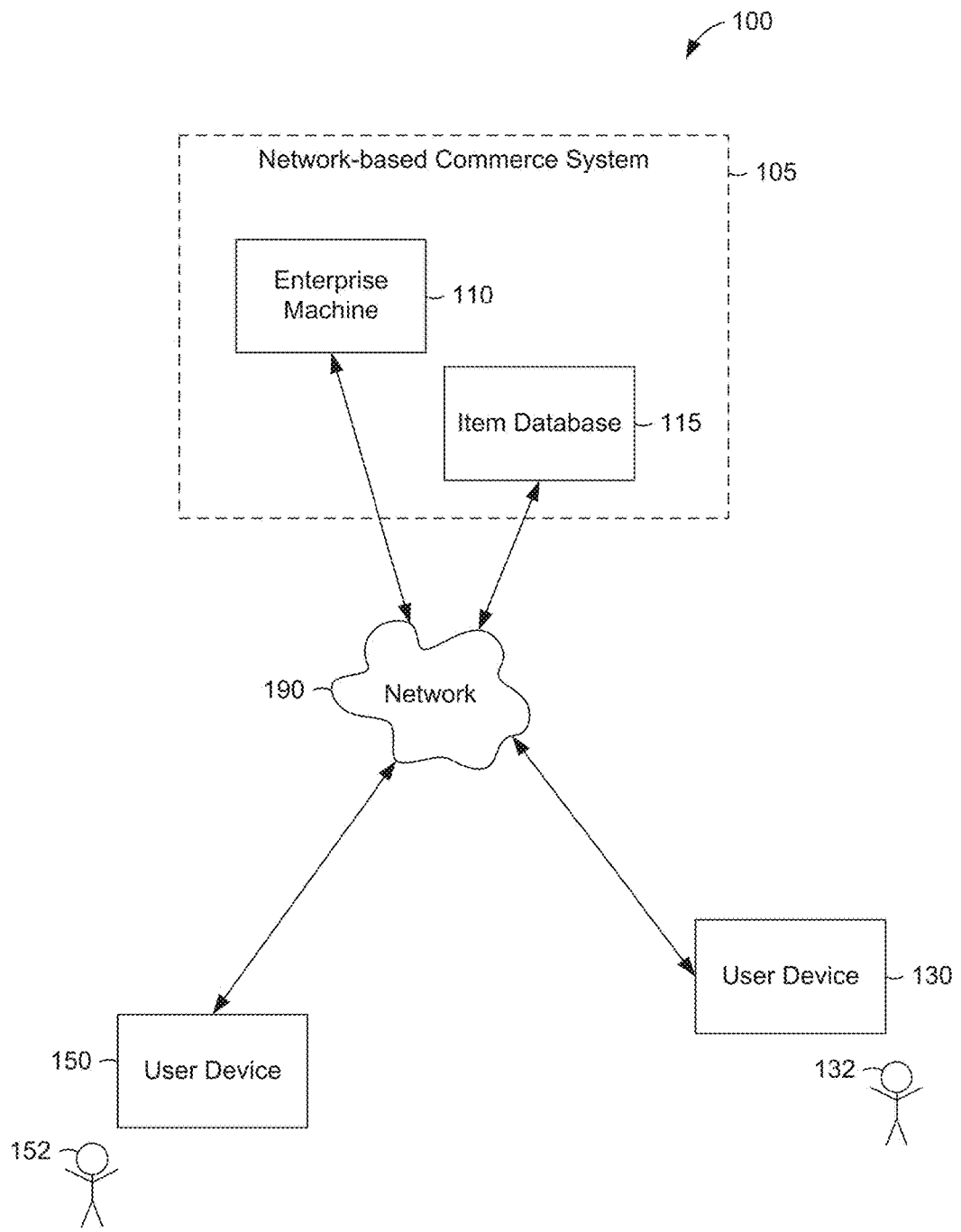
FIG. 1 is a block diagram illustrating an example of a network environment suitable for omnichannel retailing, according to example embodiments.

Example methods and systems are directed to omnichannel retailing. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A server may access information (e.g., from a database) regarding products, promotions (e.g., sales, discounts, buy one get one free offers, and the like), stores, and customers, as well as relationships between each of these types of information. The information may be stored on a per-retailer basis, aggregated across retailers, or both.

A device may determine its location (e.g., using a global positioning service ("GPS"), using Wi-Fi triangulation, etc.) within a store and display the location on a map of the store. The map of the store may be retrieved from the server.

The device may receive a shopping list of items the user desires to purchase. For example, the user may enter a list of items into the device using text fields of a user interface or selecting items presented in a user interface. As another example, the user may select the items using a different device (e.g., a personal computer connected to a web server using the Internet) and the list of items may be transmitted to the device within the store.

The device may then display the location of desired items on the map of the store. In some example embodiments, this is accomplished by retrieving the location of the items from the server. When an item is located in multiple locations, for example in an ordinary location in a particular aisle and also in a promotional location near the checkout lanes, the device may display one or more of the locations for the item. In some example embodiments, the device may present a suggested route through the store by which the user can find all of the items on the shopping list. The suggested route may be generated by the device or transmitted to the device from another computer.

The device may present recommendations for products to the user based on items near the device, items on the shopping list, or items identified by the user. For example, if the shopping list includes hot dogs, the device may present a recommendation for hot dog buns. The recommendation may be generated by the device or generated on a server and transmitted to the device for presentation to the user on a display of the device.

The device may have the ability to identify items (e.g., by scanning barcodes or quick-response ("QR") codes, or by taking a picture). The device may communicate with the server to gather information about an identified item (e.g., price, popularity, other items frequently purchased with or instead of the item, and the like). The identification of items may be performed on a server working with the device. For example, the device may take a photo of an item and transmit the image to a server. The server may receive the image, identify the item, and transmit identification information for the item (e.g., a numeric identifier, a stock photo, or a name) to the device. The device may display the received identification information to the user or store it for later use.

FIG. 1 is a network diagram illustrating a network environment 100 suitable for omnichannel retailing, according to some example embodiments. The network environment 100 includes a network-based commerce system 105 and user devices 130 and 150, all communicatively coupled to each other via a network 190. The network-based commerce system 105 may comprise multiple servers (e.g., an enterprise machine 110) and databases (e.g., an item database 115). Devices within the system 105 may communicate via the network 190 or another network. The system 105 may present a single interface to the network 190. The enterprise machine 110 and the user devices 130 and 150 may each be implemented in a computer system, in whole or in part, as described below with respect to FIG. 12.

The user device 130 or 150 may be a portable device (e.g., vehicle computer, a tablet computer, a navigational device, a portable media device, a smart phone, a smart watch, or a pair of smart glasses) capable of being operated by a user in a store. The user device 130 or 150 may be in communication with the network based enterprise machine 110. The enterprise machine 110 may provide information regarding products in the store, the layout of the store, and promotions related to products in the store to the user device 130 or 150. The user device 130 or 150 may display any of the information received from the enterprise machine 110. Additionally, the user device 130 or 150 may display information stored on the device. For example, the user device 130 or 150 may be running a dedicated app that stores information locally or a thin client app that presents information but does not perform significant processing or storage tasks.

In some example embodiments, the store is a warehouse, and the user is gathering items for shipment to customers. For example, one or more customers may have placed orders for items distributed throughout the warehouse. The user may be tasked with gathering the ordered items and bringing them to a location for packaging and shipment.

In an example embodiment, the user device 130 or 150 presents a map of the store to the user. The current location of the device, the location of items pre-selected by the user, and the location of items recommended to the user may be displayed on the map. Additionally, promotional information may be displayed. For example, based on the location of the device and the layout of the store, items near the device can be determined. Items near the device can be cross-indexed with a promotional database to determine the promotions that apply to items near the device. Those promotions may be displayed to the user.

Also shown in FIG. 1 are users 132 and 152. One or both of the users 132 and 152 may be a human user, a machine user (e.g., a computer configured by a software program to interact with the user device 130), or any suitable combination thereof (e.g., a human assisted by a machine or a machine supervised by a human). The user 132 is not part of the network environment 100, but is associated with the user device 130 and may be a user of the user device 130. For example, the user device 130 may be a vehicle computer, a tablet computer, a navigational device, a portable media device, a smart phone, a smart watch, or a pair of smart glasses belonging to the user 132. Likewise, the user 152 is not part of the network environment 100, but is associated with the user device 150. As an example, the user device 150 may be a vehicle computer, a tablet computer, a navigational device, a portable media device, a smart phone, a smart watch, or a pair of smart glasses belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the enterprise machine 110 and the user device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
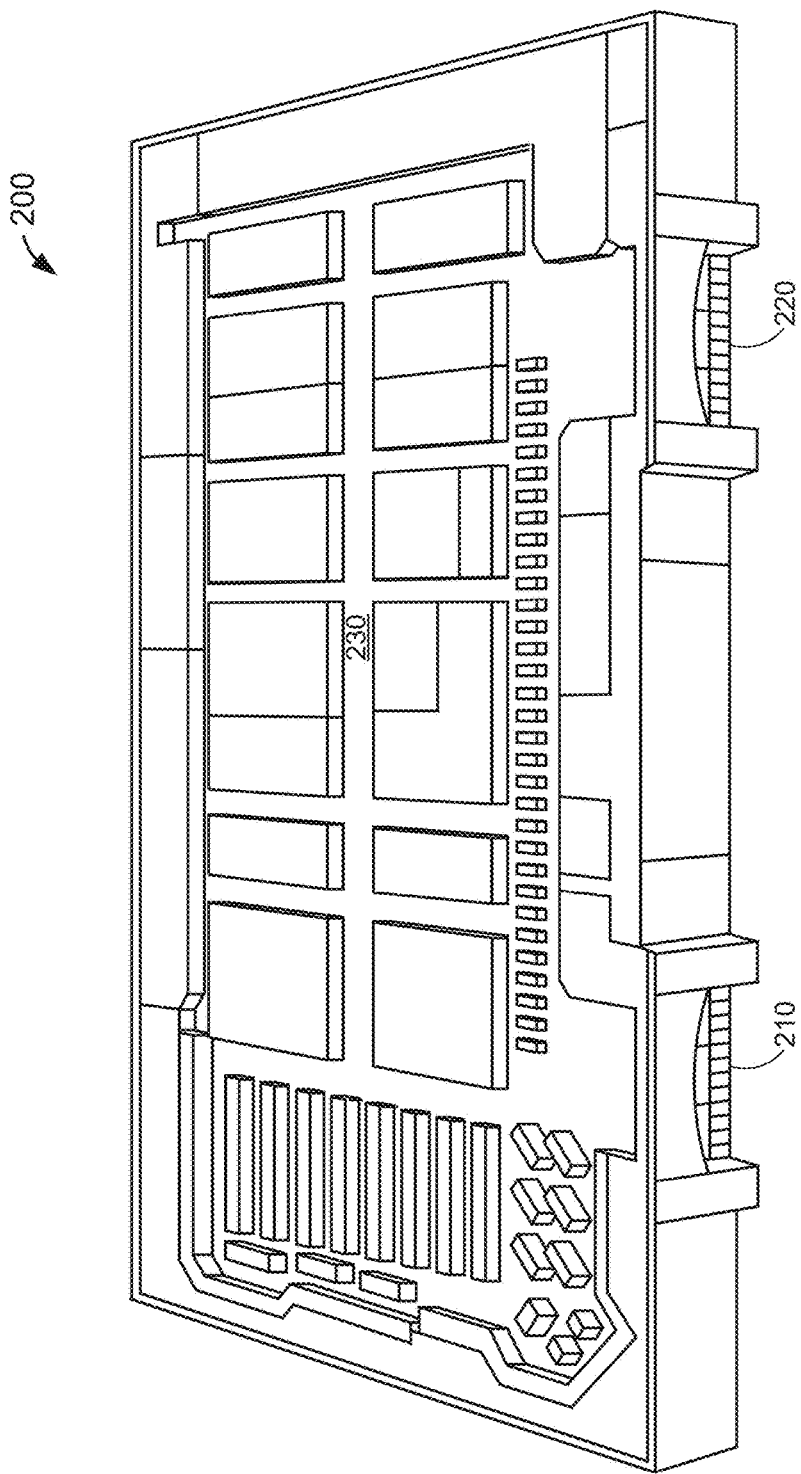
FIG. 2 is a diagram illustrating an example store layout, according to example embodiments.

FIG. 2 is a diagram 200 illustrating an example store layout, used in some example embodiments. In this store layout, two store entrances 210 and 220 can be seen as well as the aisles between sections of the store (e.g., the aisle 230). Different areas of the store may correspond to different item categories (e.g., sporting goods, groceries, toiletries, etc.). The store layout may be stored in the enterprise machine 110 prior to transmission to the user device 130 or 150 for display to the user.

Figure 3:
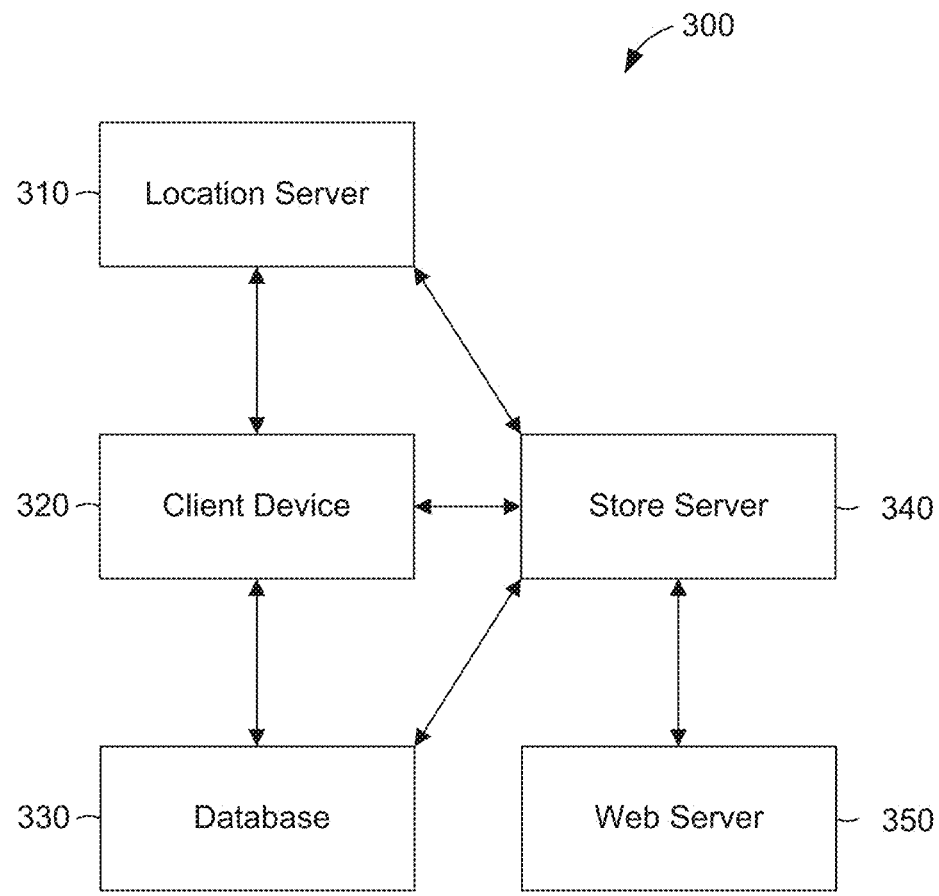
FIG. 3 is a block diagram illustrating data flows within a network environment suitable for omnichannel retailing, according to example embodiments.

FIG. 3 is a block diagram illustrating data flows within a store network environment 300 suitable for omnichannel retailing, according to some example embodiments. The network environment 300 includes a location server 310, a client device 320, a database 330, a store server 340, and a web server 350, all communicatively coupled to each other via one or more networks. The servers, databases, and devices 310-350 may each be implemented in a computer system, in whole or in part, as described below with respect to FIG. 12.

A location server 310 may determine a location of a device (e.g., the user device 130 or the user device 150) within a store. In some example embodiments, the location server 310 determines the location of the device using a wireless computer network within the store. For example, if there are multiple wireless routers in the store, it is possible to estimate the distance of the device from each router by measuring the strength of the wireless signals at the device. Then, using triangulation, the location of the device can be determined. Similarly, the location of the device may be triangulated using cell phone towers. In another example embodiment, security cameras in the store use facial recognition software to identify customers in the store and their locations. In this example embodiment, the store's network can be connected to the security cameras and transmit the location of the customer associated with the device to the device. Those of ordinary skill in the art will recognize that other methods of identifying the location of the device may also be used without straying from the invention. The location server 310 may be part of the store server 340, or may be an independent device.

A client device 320 may be a user device 130 or 150. An application running on the client device 320 may, using the location server 310, present information about the device location to the user. The application may be a separate app for each retailer or a shared app for multiple retailers. The user may log into the application using credentials that are specific to the retailer or using a universal customer account. The credentials may be shared with a store server 340. Universal credentials may allow a store server 340 to access a greater body of information about the user to consider when creating recommendations. For example, rather than only accessing the user's transactions with the current retailer, all of the user's transactions with all participating retailers and e-tailers can be considered.

In some example embodiments, when the user logs into the application, an initial promotion is presented to the user (for example, a percentage off discount coupon that applies when a certain minimum purchase is made in conjunction with using the application to manage the shopping list). The client application may be integrated with the store's online counterpart, which may include a pick-up-in-store feature. In such a case, the user may be able to have items from the shopping list waiting for pick up rather than having to find each item individually on the store shelves.

Data regarding store products and services may be stored in a database 330. The database 330 may be physically located at the store and communicated via the store's wireless network to the client device 320. By combining information from the location server 310 and the database 330, the client device 320 may present information to the user about products near the device.

The database 330 may contain data regarding a store's physical layout as well as the distribution of products within that layout. The layout information may be communicated to the store server 340. In turn, the client device 320 may receive the plan data from the store server 340. Integrating the plan data with the location data from the location server 310 and the product data from the database 330, the client device 320 can display a map of the store that includes the user's position, general product data, and additional product data. In some cases, a particular product may be located at multiple locations in a store. In these cases, all locations can be shown to the user or only a subset may be displayed. When only a subset is displayed, a user interface element may be presented to allow the user to choose other locations to display. For example, one location may be displayed at a time along with a "Next" button. Each time the "Next" button is pressed, a different location may be displayed until all locations have been cycled through.

The store server 340 may further be in communication with a web server 350. For example, the store may have a corresponding e-commerce site running on the web server 350. An e-commerce site running from one or more web servers may be called a "webstore." The store may have a business relationship with an e-commerce site such as eBay, and be in communication with a web server 350 running the independent e-commerce site. Information regarding products available for purchase from the store running on the web server 350 may be communicated to the store server 340, and from the store server 340 to the client device 320 for presentation to a user. For example, if the store is out of stock for a particular item, the user may be presented with an option to buy the product from the store's webstore. As another example, a recommendation of an item for a user may be determined based on the user's personal profile (e.g., purchasing history, current shopping list, etc.) and recommended to the user to purchase from the web server 350 or the physical store. The webstore running on the web server 350 may be a dedicated store corresponding to the physical store, or it may be an electronic storefront within a larger electronic store. In some example embodiments, information about the user's purchasing history is acquired from sources other than or in addition to the store. For example, the user may have an eBay shopping history that can be used to provide recommendations to items of interest.

Figure 4:
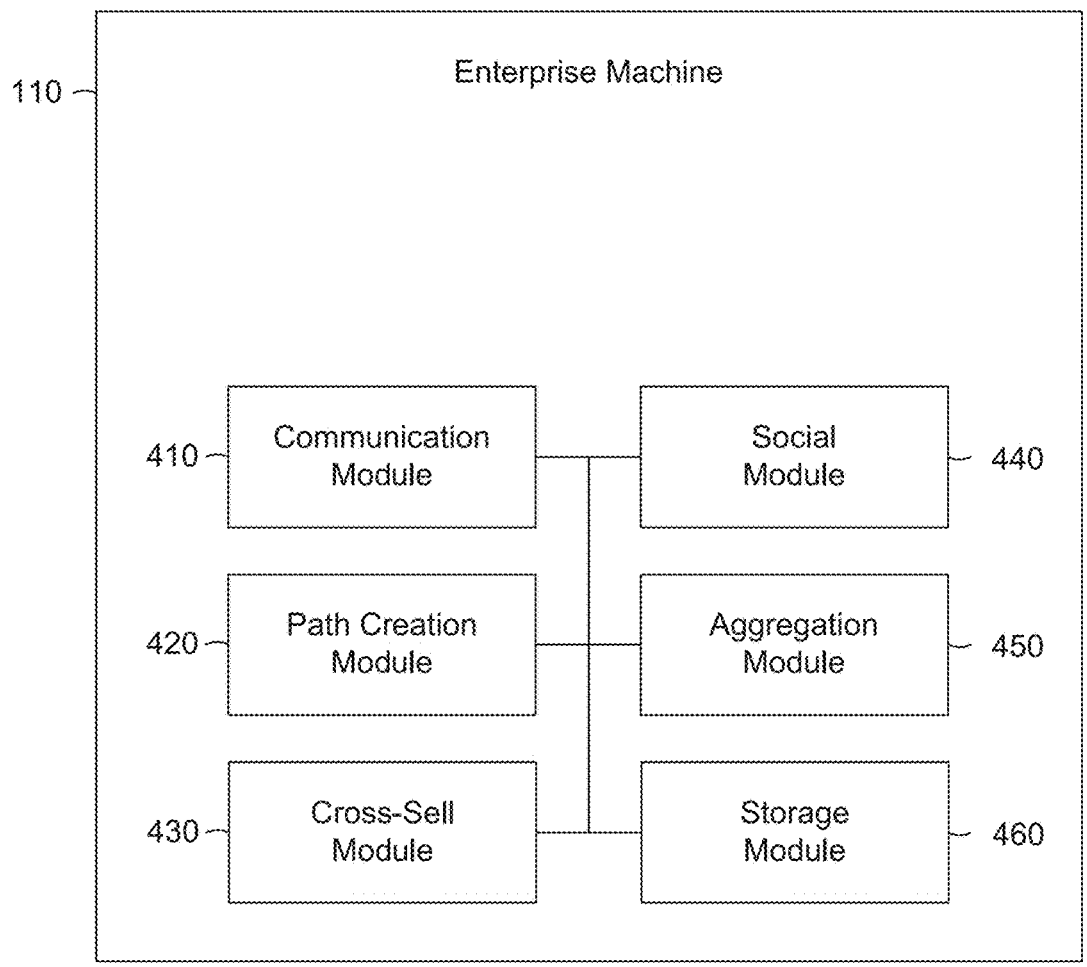
FIG. 4 is a block diagram illustrating components of an enterprise machine for omnichannel retailing, according to example embodiments.

FIG. 4 is a block diagram illustrating components of the enterprise machine 110, according to some example embodiments. The enterprise machine 110 is shown as including a communication module 410, a path creation module 420, a cross-sell module 430, a social module 440, an aggregation module 450, and a storage module 460, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. For example, in one example embodiment, the path creation module 420 may be implemented in the user device 130 or 150 rather than the enterprise machine 110, or partially implemented in the user device 130 or 150 and partially implemented in the enterprise 110, communicating as necessary via the network 190.

The communication module 410 may control communication with the client device 320 running on the user device 130 or 150. The communication module 410 may also communicate with the item database 115, the web server 350, and the store database 330. In some example embodiments, the communication module 410 acts as a go-between, passing information between the various devices with which the enterprise machine 110 is in communication. The communication module 410 may also send the data to the storage module 460, for storage on the enterprise machine 110.

The path creation module 420 may create a path for a user through a store. For example, the store plan may be received from the database 330, and the user's shopping list may be received from the user device 130 or 150. The path creation module 420 may then create a plan to take the user through the store to the selected items. The path chosen may be the most efficient path or may be designed to guide the user past selected areas of the store (e.g., promotional displays, seasonal items, etc.), or a combination thereof.

The cross-sell module 430 may identify items of interest to a user based on items in the user's shopping list or based on items scanned by the user. The user may scan items other than those on the shopping list. As an example of a recommendation, based on a report from the aggregation module 450 that a first item is often purchased with a second item and that the second item is in the user's shopping list, the cross-sell module 430 may generate a recommendation for the first item to the user. The recommendation may be transmitted via the communication module 410 to the user device 130 or 150, and displayed to the user on a display device (e.g., an LCD screen) of the user device 130 or 150 by the display module 520. The user may choose to share the recommended item, the items in the shopping list, a scanned item, or any combination thereof via social media (e.g., Facebook, Twitter, Pinterest, etc.) using the social module 440.

After the user scans an item, one or more cross-sell items may be identified based on the scanned item, the user's history, aggregated user data, or any suitable combination thereof. The identified cross-sell items may be presented to the user on the display of the device. For example, the identified cross-sell items may be displayed in a column on the right-hand side of the screen. The user may select a cross-sell item and click a button (e.g., a button labeled "Take me there."). In response to activating the button, the device may add the cross-sell item to the map and plot a path from the device's current position to the location of the cross-sell item.

Figure 5:
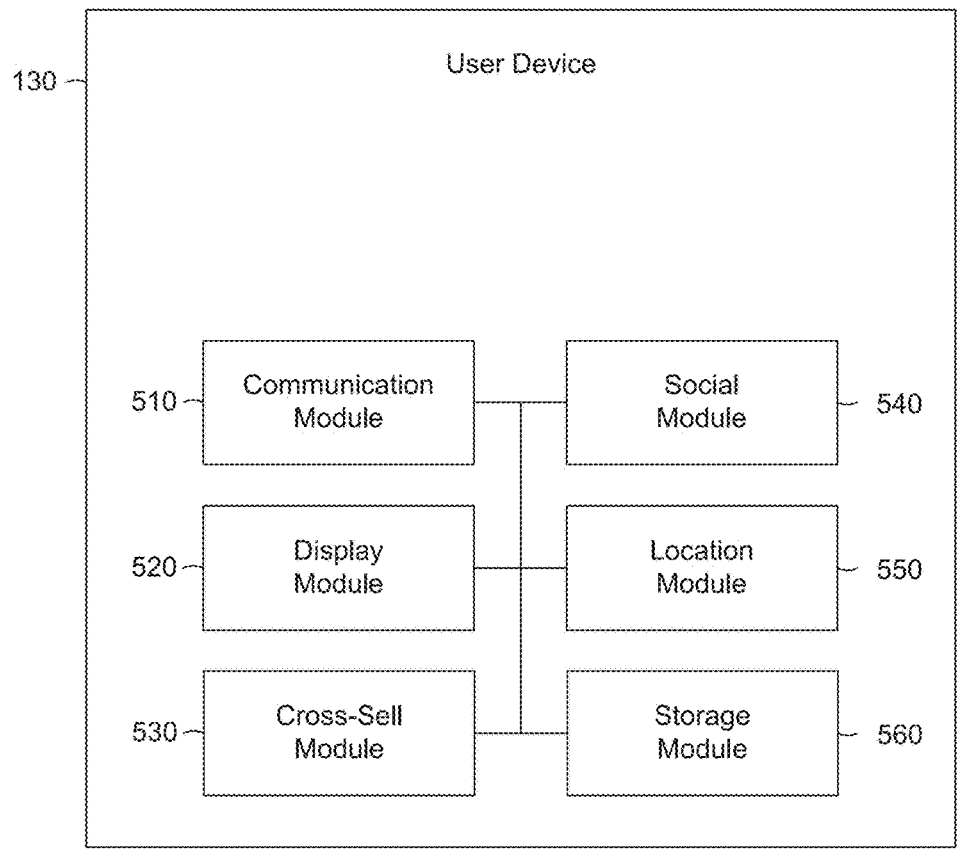
FIG. 5 is a block diagram illustrating components of a user device for omnichannel retailing, according to example embodiments.

FIG. 5 is a block diagram illustrating components of the user device 130, according to some example embodiments. The user device 130 is shown as including a communication module 510, a display module 520, a cross-sell module 530, a social module 540, a location module 550, and a storage module 560, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 510 may communicate with the store's network, the enterprise machine 110, the Internet, or any suitable combination thereof. Information received via the communication module 510 may be presented via the display module 520, stored via the storage module 560, or both. The communication module 510 may also be used to retrieve information regarding items in the store such as user reviews and related items. For example, the user may use a camera on the user device 130 to take a picture of a bar code, a QR code, or the product itself. The user device 130 can then use the image to identify the product, transmit the image to the enterprise machine 110 to identify the product, or communicate with the store's local network to identify the product. Once the product is identified, information about the product can be gathered (e.g., from the item database 115) and sent to the user device 130 for presentation to the user.

The cross-sell module 530 may identify items of interest to the user based on the user's shopping list, current location (provided by the location module 550), or a scanned item. In some example embodiments, the only one of the cross-sell module 530 and the cross-sell module 430 is implemented. In other example embodiments, the cross-sell module 430 and the cross-sell module 530 are configured to generate different types of recommendations. For example, the cross-sell module 430 may be configured to generate recommendations based on the user's past purchases while the cross-sell module 530 is configured to generate recommendations based on items scanned by the user in the store. The items of interest may be presented to the user via the display module 520.

The social module 540 may be used to share items on the shopping list or recommended items via social media. For example, the user may select one or more social networks and post information on the chosen social networks about the item (e.g., name of the product, brand, size, color, etc.) as well as the store in which the user is shopping (e.g., name of the store, location of the store, hours, phone number, etc.). In some example embodiments, the only one of the social module 530 and the social module 430 is implemented. In other example embodiments, the social module 530 is configured to receive input from the user and communicate with the social module 430, while the social module 430 is configured to communicate with the selected social networks.

The location module 550 can determine the location of the user device 130. For example, the location module 550 may use a GPS sensor to determine the position of the device. As another example, the location module 550 may use Wi-Fi triangulation to determine the position of the device. In another embodiment, inertial sensors are used to determine the position of the device. The location module 550 may be in communication with the location server 310. For example, the location server 310 may identify the location of the user device 130 and transmit it, via the communication module 510, to the location module 550. As another example, the location server 310 may gather data useful to the determination of the location of the user device 130 and transmit that data to the location module 550, which may use the data to determine the location. To illustrate, the location server 310 may determine which Wi-Fi access points are able to detect the user device 130 and transmit the locations of those access points to the location module 550. The location module 550 may use those locations along with detection of the relative strength of the wireless signal from each of those access points to triangulate the position of the user device 130. In still another example, the location server 310 is not used, and all measurements and calculations related to determining the location of the device 130 are performed by the location module 550.

The storage module 560 can store and retrieve data for use by the other modules 510-550. For example, the storage module 560 may access a file system on a hard drive or tables in a relational database to store and retrieve data. The physical device storing the data may be part of the user device 130 or accessed over a network 190.

Figure 6:
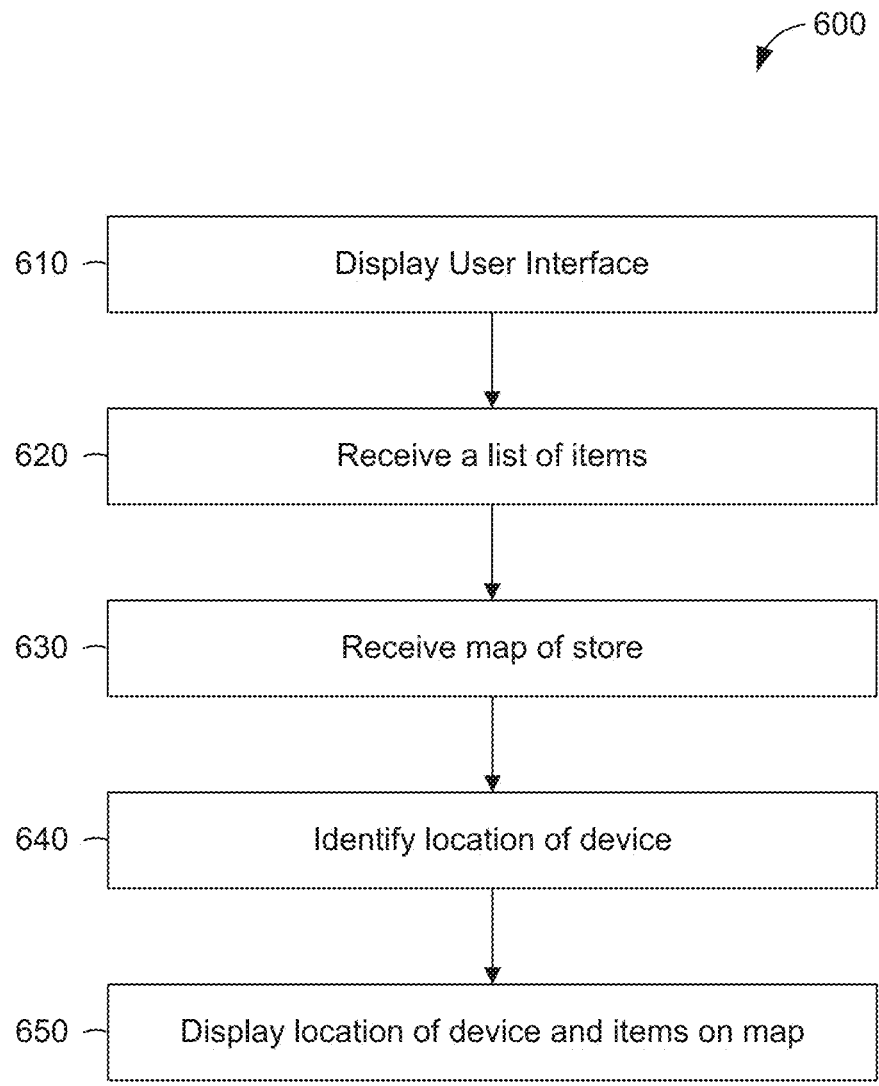
FIG. 6 is a flow diagram illustrating operations of omnichannel retailing, according to example embodiments.

FIG. 6 is a flowchart illustrating operations of a device (e.g., user device 130 or 150) in performing a method 600 of omnichannel retailing, according to some example embodiments. Operations in the method 600 may be performed by the user device 130 or 150, using modules described above with respect to FIG. 5.

In operation 610, the device may display a user interface to a user, through which the user may enter a list of items. For example, the user may type in the name of each item, select the items from a drop down list, navigate through a tree of categories to find the item, or any suitable combination thereof. Alternatively, a list of frequently-purchased items for the user may be stored in the cloud (e.g., in part of the network-based commerce system 105) and the entire list selected at once by the user. For example, the user may create a list on a home computer and upload the list to the cloud before going to the store, then access the list from the user device 130 or 150 by receiving the list from the cloud.

In operation 620, the device receives the list of items. For example, if the list of items is stored in the cloud, the user may select the name of the list from a drop-down menu in a web-based user interface presented in operation 610. After selecting the name of the list, the contents of the list may be transmitted from a server (e.g., the enterprise machine 110) to the user device 130 or 150, which receives the list. The list may be received as customized data objects, JSON data, HTML files, or XML files, as just a few examples.

In operation 630, the device receives a map of the store. For example, the device may receive an image (e.g., a graphics interchange format ("GIF") image, a joint photographic experts group ("JPEG") image, or a vector image) depicting a map of the store. The device may also receive data correlating locations in the image of the store to real-world coordinates. For example, the GPS location of each corner of the image may be received, allowing the device to calculate (e.g., using linear interpolation) the GPS coordinates of each pixel in the image. In another example, the coordinates of elements in the image (e.g., the endpoints of vectors in a vector image) directly correspond to real-world coordinates. To illustrate, an aisle in a store may extend from latitude 45.12342 N to latitude 45.12351 N at longitude 28.73670, and thus be represented by a vector extending from (28.73670, 45.12342) to (28.73670, 45.12351).

In operation 640, the location of the device is identified. For example, a GPS sensor in the device may be used to determine the longitude and latitude of the device or Wi-Fi triangulation may be used to determine the location of the device in the store. To illustrate, the device may communicate with a plurality of Wi-Fi devices in the store, each of which is able to measure the strength of the signal from the user device 130. The strength of the signal at each Wi-Fi device may correspond to the distance between the user device 130 and the Wi-Fi device. The Wi-Fi devices may communicate with a central server, which determines the location of the user device 130 in the store and communicates the location of the user device 130 to the user device 130.

In operation 650, the device displays the location of the device and the items in the list on the map of the store. For example, the location of the device may be superimposed as a red dot or a black "X" on the map and the location of each item may be presented as a yellow dot or other specified logo or image (e.g., a logo associated with the store). In some example embodiments, only the next item on the list is displayed. For determining the next item, the list may be kept in an order it was entered by the user, sorted, or ordered to control the path taken by the user. A sorted list is organized by a sort criterion, such as an alphabetical sort, price sort, or distance sort (e.g., distance of the item from the user device 130's present location). As an example of a list ordered to control the path taken by the user, the items in the list may be ordered to reduce the total distance traveled to gather all of the items.

Figure 7:
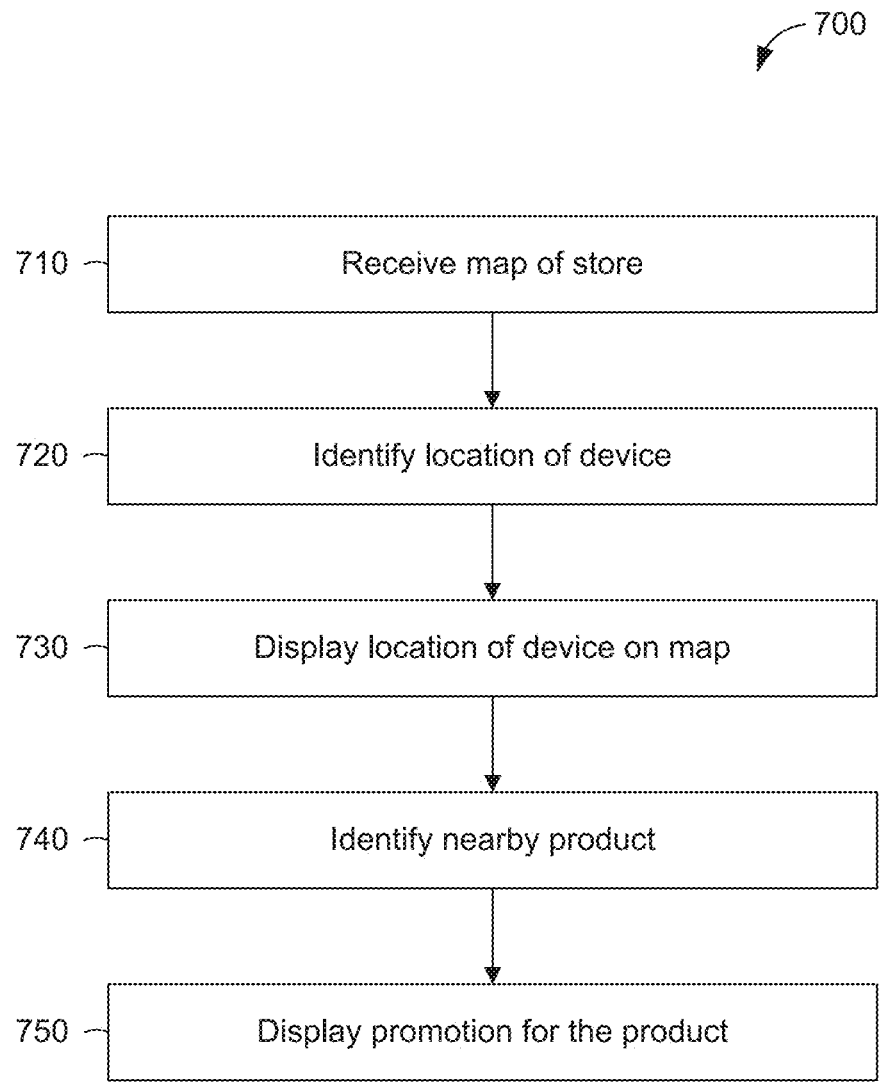
FIG. 7 is a flow diagram illustrating operations of omnichannel retailing, according to example embodiments.

FIG. 7 is a flowchart illustrating operations of a device (e.g., user device 130 or 150) in performing a method of omnichannel retailing, according to some example embodiments. Operations in the method 700 may be performed by the user device 130 or 150, using modules described above with respect to FIG. 5.

In operation 710, the user device 130 or 150 may receive a map of the store (e.g., from the enterprise machine 110), as described above with respect to operation 630. For example, the communication module 510 may receive map information from the enterprise machine 110.

In operation 720, the user device 130 or 150 may identify its location within the store. For example, the location module 550 may access a GPS sensor in the device to determine the longitude and latitude of the device. Alternatively, the location module 550 may use Wi-Fi triangulation may be used to determine the location of the device in the store. To illustrate, the device may communicate with a plurality of Wi-Fi devices in the store, each of which is able to measure the strength of the signal from the user device 130. The strength of the signal at each Wi-Fi device may correspond to the distance between the user device 130 and the Wi-Fi device. The Wi-Fi devices may communicate with a location server 310, which determines the location of the user device 130 in the store and communicates the location of the user device 130 to the user device 130.

In operation 730, the user device 130 or 150 may present the map on a display device, including the location of the device within the store. Accordingly, the display module 520 may present a graphically layout of the store (e.g., the map received in operation 710).

In operation 740, the user device 130 or 150 may identify the location of a nearby product based on the location of the device within the store. In example embodiments, the cross-sell module 530 of the user device 130 may perform this operation. For example, the user may be browsing the aisles of the store, and a product in the same aisle as the user or in an adjacent aisle to the user may be identified.

In operation 750, an available promotion for the nearby product may be displayed on the display device. The promotion may have been pre-determined (e.g., a sale on products by a particular manufacturer) or dynamically generated and presented to the user (e.g., based on prior purchases by the user) by the cross-sell module 430 or the cross-sell module 530.

Figure 8:
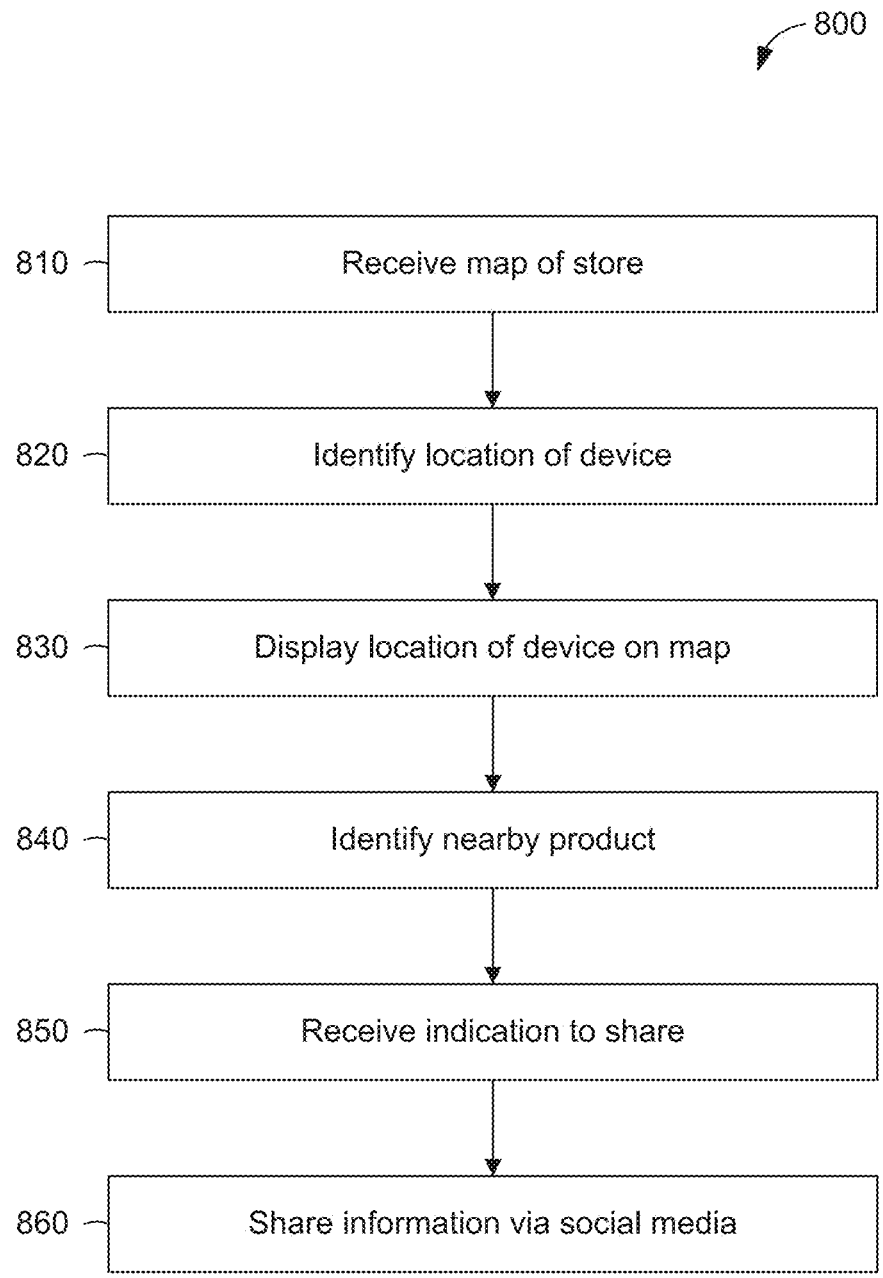
FIG. 8 is a flow diagram illustrating operations of omnichannel retailing, according to example embodiments.

FIG. 8 is a flowchart illustrating operations of a device (e.g., user device 130 or 150) in performing a method of omnichannel retailing, according to some example embodiments. Operations in the method 800 may be performed by the user device 130 or 150, using modules described above with respect to FIG. 5.

In operation 810, the device may receive a map of the store (e.g., from the enterprise machine 110), as described above with respect to operation 630. For example, the communication module 510 may receive map information from the enterprise machine 110.

In operation 820, the device may identify its location within the store (for example, using the location server 310 or the location module 550). For example, the location module 550 may access a GPS sensor in the device to determine the longitude and latitude of the device. Alternatively, the location module 550 may use Wi-Fi triangulation may be used to determine the location of the device in the store. To illustrate, the device may communicate with a plurality of Wi-Fi devices in the store, each of which is able to measure the strength of the signal from the user device 130. The strength of the signal at each Wi-Fi device may correspond to the distance between the user device 130 and the Wi-Fi device. The Wi-Fi devices may communicate with a location server 310, which determines the location of the user device 130 in the store and communicates the location of the user device 130 to the user device 130.

In operation 830, the device may present the map on a display device, including the location of the device within the store. For example, the location of the device may be superimposed as a red dot or a black "X" on the map and the location of each item may be presented as a yellow dot or appropriate image (e.g., a logo associated with the store or an image of the item. In some example embodiments, only the next item on the list is displayed. For determining the next item, the list may be kept in an order it was entered by the user, sorted, or ordered to control the path taken by the user. A sorted list is organized by a sort criterion, such as an alphabetical sort, price sort, or distance sort (e.g., distance of the item from the user device 130's present location). As an example of a list ordered to control the path taken by the user, the items in the list may be ordered to reduce the total distance traveled to gather all of the items.

In operation 840, the user device 130 or 150 may identify the location of a nearby product based on the location of the device within the store. For example, the user may be browsing the aisles of the store, and a product in the same aisle as the user or in an adjacent aisle to the user may be identified by the cross-sell module 430 or the cross-sell module 530. For example, the product may be frequently purchased with or instead of another item on the user's shopping list, frequently purchased by the user, recommended by the user's friends on a social media site, or any suitable combination thereof.

In operation 850, the device may present an option to share the product on social media and receive an indication from the user to accept the option. For example, an icon may be presented by the social module 540 that is operable to cause the product to be shared on a social media site corresponding to the icon.

In operation 860, after receiving the indication to share, the device may share information about the recommended product via social media. For example, the user's social media credentials (e.g., user name and password) may be stored on the device or on the enterprise machine 110. The social module 540 may communicate with the enterprise machine to cause the enterprise machine 110 to connect to a social media site on the user's behalf and post information about the product.

Figure 9:
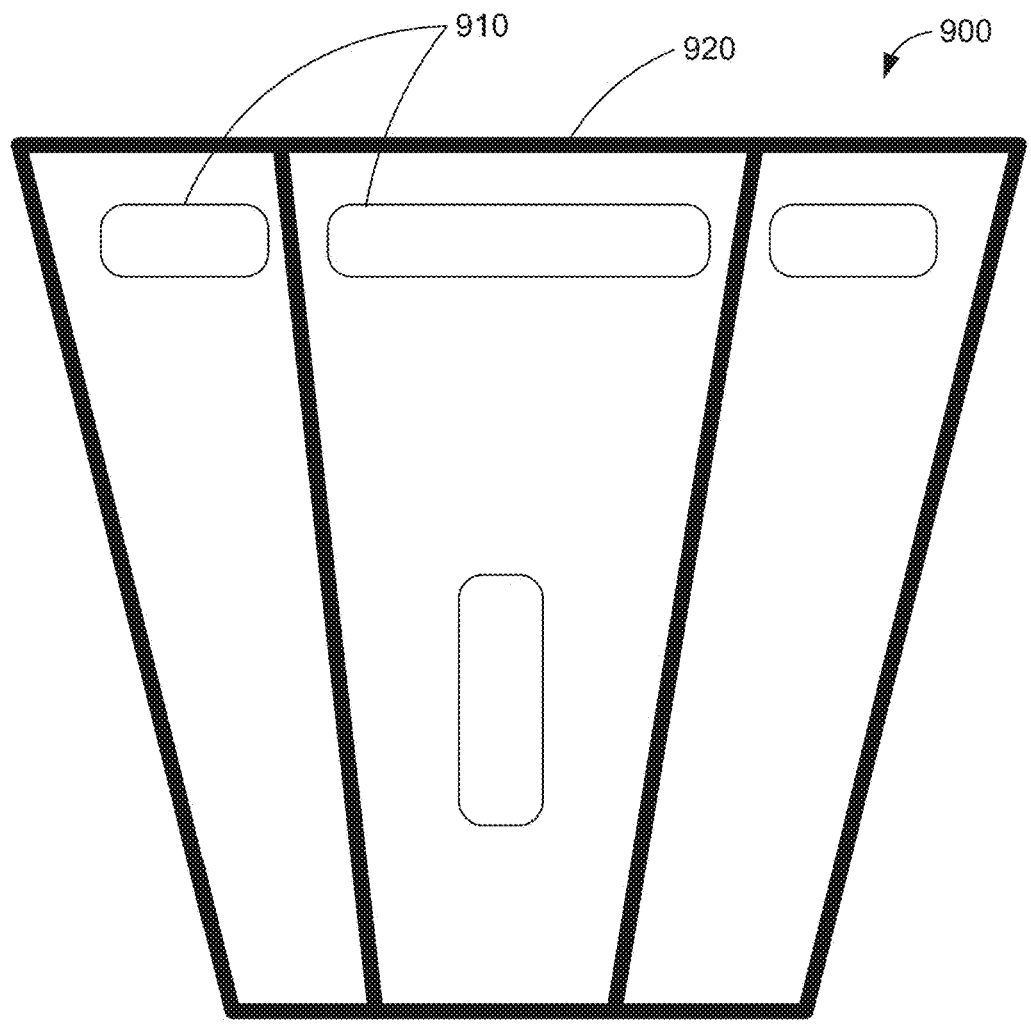
FIG. 9 is a diagram illustrating a mechanical device able to hold a device suitable for omnichannel retailing, according to example embodiments.
Figure 10:
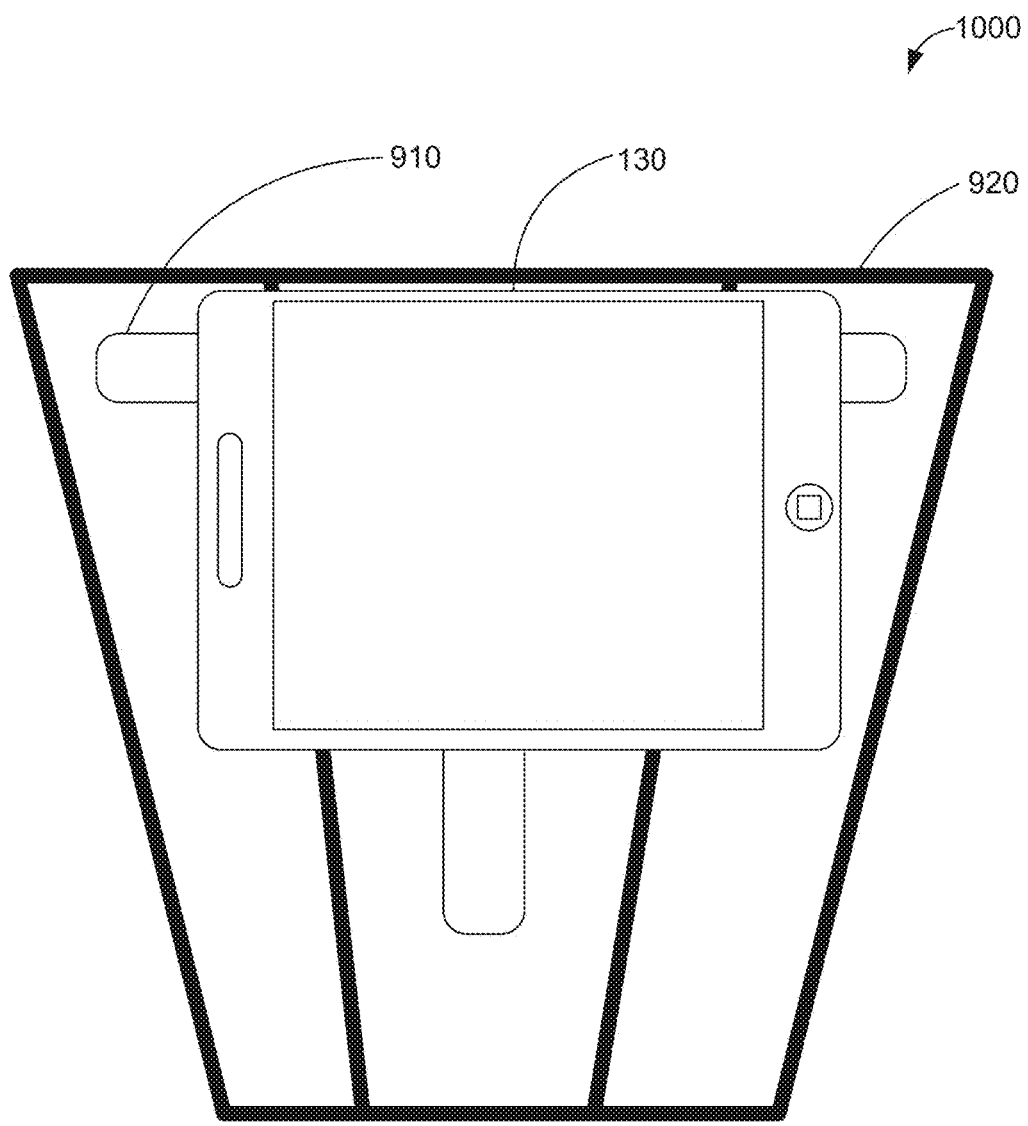
FIG. 10 is a diagram illustrating a mechanical device able to hold a device suitable for omnichannel retailing, according to example embodiments.
Figure 11:
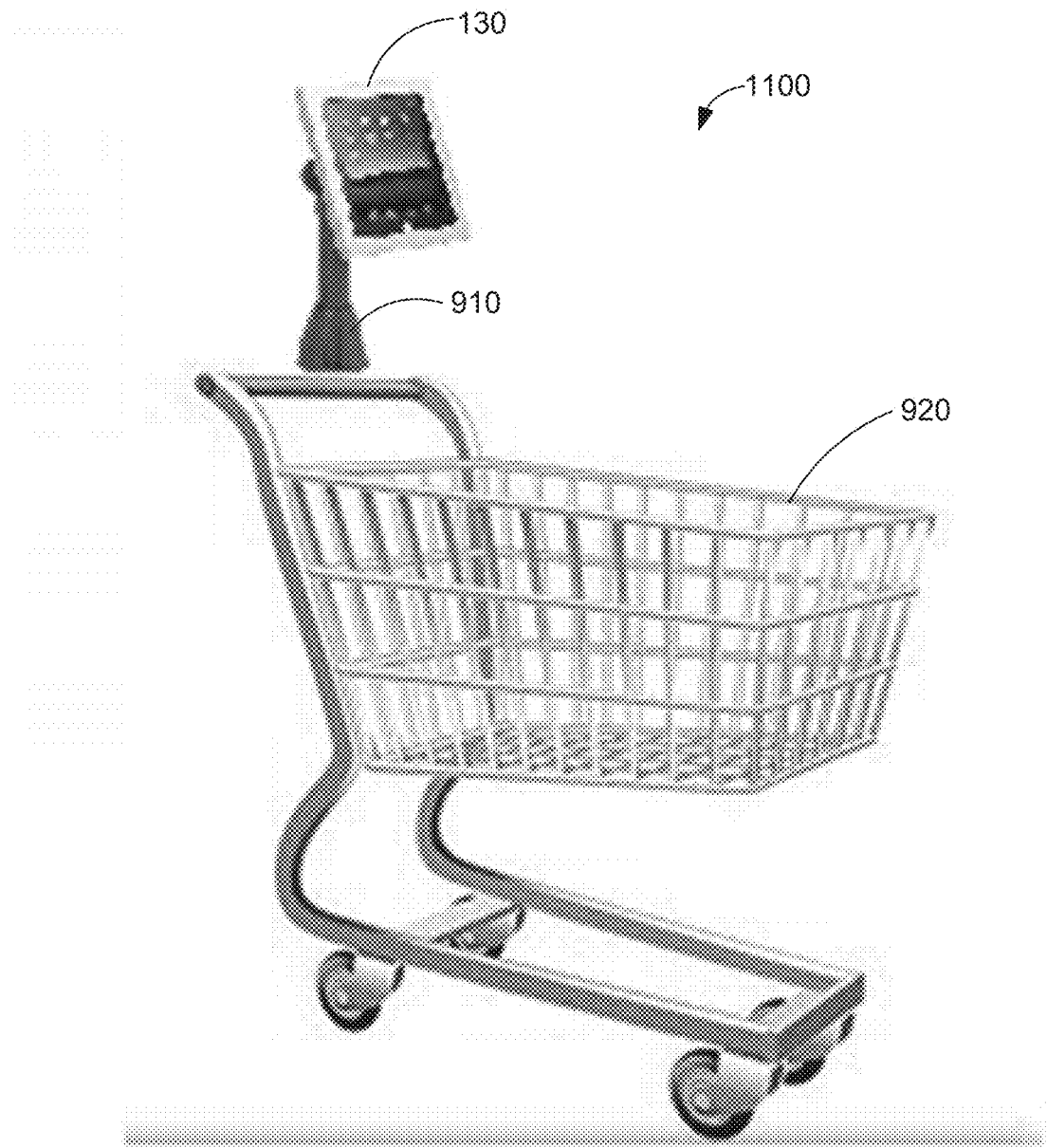
FIG. 11 is a diagram illustrating a mechanical device able to hold a device suitable for omnichannel retailing, according to example embodiments.

FIGS. 9-11 are diagrams 900, 1000, and 1100 illustrating a plurality of holders 910 able to hold a device suitable for omnichannel retailing, according to some example embodiments.

The holders 910 may be attached to a shopping cart 920 by any suitable fastener (e.g., clips, hooks, a hook-and-loop system such as Velcro, glue, or any suitable combination thereof). The user device 130 may be placed in the holder 910 such that the user can see the display area of the user device 130 while pushing the cart 920 as shown in FIG. 10 and FIG. 11. The user device 130 may be placed on a ledge of the holder 910, clipped into the holder 910, attached with a hook-and-loop fastener to the holder 910, or any suitable combination thereof. In some example embodiments, the holder 910 is designed to avoid obstructing a camera lens of the user device 130. The holder 910 may hold the camera so that it points in a certain direction. The camera may be used to provide a video feed or to take periodic snapshots of the store. By analyzing the video feed or the generated photos, the position of the user device 130 may be determined in accordance with one embodiment. For example, if the camera is adjusted to aim at items on the bottom shelf three feet ahead of and to the right of the cart, then identifying the items photographed will give the position of the cart within the store. As another example, the camera may be adjusted to aim at the floor of the store, and identify marks may be placed on or embedded into the floor.

The holder 910 may have multiple slots for holding devices of different sizes and in different orientations. For example, a tablet may be held in either landscape or portrait orientation, smaller slots may be used for a smartphone or mini-tablet than a tablet, and so forth. Alternatively, the holder 910 may be adjustable to accommodate devices of various sizes and dimensions. The holder 910 may be attached to the handle of the cart, the body of the cart, or both.

According to various example embodiments, one or more of the methodologies described herein may facilitate providing information to a shopper in a physical retail store regarding items on a shopping list or recommended items. Moreover, one or more of the methodologies described herein may facilitate the use of a mobile computing device while shopping in a physical retail store. Additionally, one or more of the methodologies described herein may facilitate the user's interaction with social media while shopping in a physical retail store. Furthermore, one or more of the methodologies described herein may facilitate the user's ability to efficiently navigate a physical retail store or warehouse.

When these effects are considered in aggregate, one or more of the methodologies described herein may obviate a need for certain efforts or resources that otherwise would be involved in omnichannel retailing. Efforts expended by a user in identifying items of interest may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 12:
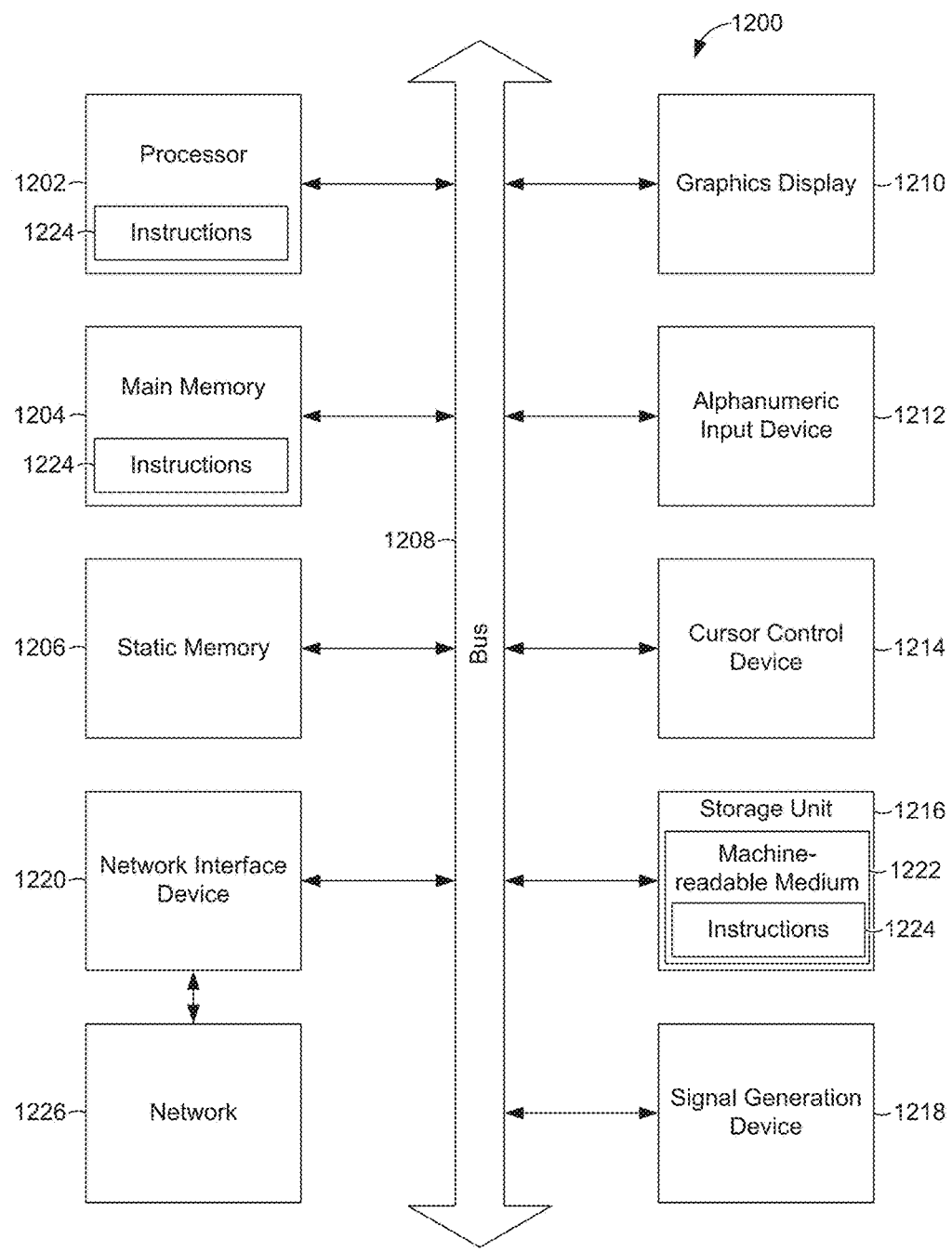
FIG. 12 is a simplified block diagram of a machine in an example form of a computing system within which a set of instructions for causing the machine to perform any one or more of the methodologies discussed herein may be executed.

FIG. 12 is a block diagram illustrating components of a machine 1200, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 12 shows a diagrammatic representation of the machine 1200 in the example form of a computer system and within which instructions 1224 (e.g., software, a program, an application, an applet, an app, or other executable code) for causing the machine 1200 to perform any one or more of the methodologies discussed herein may be executed, in whole or in part. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a set-top box (STB), a personal digital assistant (PDA), a cellular telephone, a smartphone, a wearable computer, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or voice-activated controller, or other pointing instrument), a storage unit 1216, a signal generation device 1218 (e.g., a speaker), and a network interface device 1220.

The storage unit 1216 includes a machine-readable medium 1222 on which is stored the instructions 1224 embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 (e.g., network 190) via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1200), such that the instructions, when executed by one or more processors of the machine (e.g., processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
    one or more processors of one or more machines configured to perform operations comprising:
    determining, by a GPS sensor in a user device, a location of the user device within a store;
    receiving, from a server over a network, a map of the store;
    identifying a first item from a list of a plurality of items, the first item having a plurality of locations within the store;
    selecting a first location of the first item from among the plurality of locations within the store;
    in response to the determining of the location of the user device within the store, generating, based on the list of the plurality of items and the map of the store, a path to the first location of the first item;
    displaying the location of the user device within the store and the first location of the first item on the map of the store;
    determining, based on the location of the user device within the store as determined by the GPS sensor in the user device, a recommended item;
    in response to the determining the recommended item, displaying on a user interface content associated with the recommended item;
    displaying a user interface element operable to receive user selection of a different location of the first item from among the plurality of locations within the store; and
    in response to receiving, via the user interface element, a user selection of the different location of the first item from among the plurality of locations within the store, ceasing display of the first location of the first item on the map of the store and displaying the different location of the first item on the map of the store.

2. The system of claim 1, wherein:
    a second item on the list of the plurality of items is located at multiple locations within the store; and
    the operations further comprise:
    selecting a location of the second item from among the multiple locations based on a distance of each of the multiple locations from the first location of the first item; and
    displaying the selected location of the second item.

3. The system of claim 1, wherein the operations further comprise:
    determining that a second item on the list of the plurality of items is unavailable in the store; and
    presenting a user interface operable to order the second item from an electronic commerce site.

4. The system of claim 1, wherein:
    the system further comprises an imaging device; and
    the operations further comprise:
    recognizing a second item based on an input from the imaging device; and
    recommending a third item based on the recognized second item.

5. A method comprising:
    determining, by a GPS sensor in a user device, a location of the user device within a store;
    receiving, from a server over a network, a map of a store;
    identifying a first item from a list of a plurality of items, the first item having a plurality of locations within the store;
    selecting a first location of the first item from among the plurality of locations within the store;
    in response to the determining of the location of the user device within the store, generating, based on the list of the plurality of items and the map of the store, a path to the first location of the first item;

displaying the location of the user device within the store and the first location of the first item on the map of the store;

determining, based on the location of the user device within the store as determined by the GPS sensor in the user device, a recommended item;

in response to the determining the recommended item, displaying on a user interface content associated with the recommended item;

displaying a user interface element operable to receive user selection of a different location of the first item from among the plurality of locations within the store; and in response to receiving, via the user interface element, the user selection of the different location of the first item from among the plurality of locations within the store, ceasing display of the first location of the first item on the map of the store and displaying the different location of the first item on the map of the store.

6. The method of claim 5, wherein a second item on the list of the plurality of items is located at multiple locations within the store the method further comprising:

selecting a location of the second item from among the multiple locations based on a distance of each of the multiple locations from the first location of the first item; and displaying the selected location of the second item.

7. The method of claim 5, further comprising:

determining that a second item on the list of the plurality of items is unavailable in the store; and displaying a user interface operable to order the second item from an electronic commerce site.

8. The method of claim 5, further comprising:

recognizing a second item based on an input from an imaging device; and recommending a third item based on the recognized second item.

9. The method of claim 5, further comprising:

identifying a second item having a plurality of locations within the store;

selecting a location of the second item from among the plurality of locations based on a distance of each of the plurality of locations of the second item from the first location of the first item; and displaying the selected location of the second item on the map of the store.

10. A non-transitory machine-readable medium having stored therein a set of program instructions which, when executed by one or more processors of a machine, cause the machine to perform operations comprising:

determining, by a GPS sensor in a user device, a location of the user device within a store;

receiving, from a server over a network, a map of the store;

identifying a first item from a list of a plurality of items, the first item having a plurality of locations within the store;

selecting a first location of the first item from among the plurality of locations within the store;

in response to the determining of the location of the user device within the store, generating, based on the list of the plurality of items and the map of the store, a path to the first location of the first item;

displaying the location of the user device within the store and the first location of the first item on the map of the store;

determining, based on the location of the user device within the store as determined by the GPS sensor in the user device, a recommended item;

in response to the determining the recommended item, displaying on a user interface content associated with the recommended item;

displaying a user interface element operable to receive user selection of a different location of the first Item from among the plurality of locations within the store; and in response to receiving, via the user interface element, a user selection of the different location of the first item from among the plurality of locations within the store, ceasing display of the first location of the first item on the map of the store and displaying the different location of the first item on the map of the store.

11. The non-transitory machine-readable medium of claim 10, wherein the operations further comprising:

determining that a second item on the list of the plurality of items is unavailable in the store; and displaying a user interface operable to order the second item from an electronic, commerce site.

12. The non-transitory machine-readable medium of claim 10, wherein the selecting of the first location of the item from among the plurality of locations is based on a distance of each of the plurality of locations from the location of the user device.

* * * * *